Jan. 2, 1940.  J. M. WRIGHT  2,185,698
BICYCLE
Filed Oct. 27, 1938  3 Sheets-Sheet 1
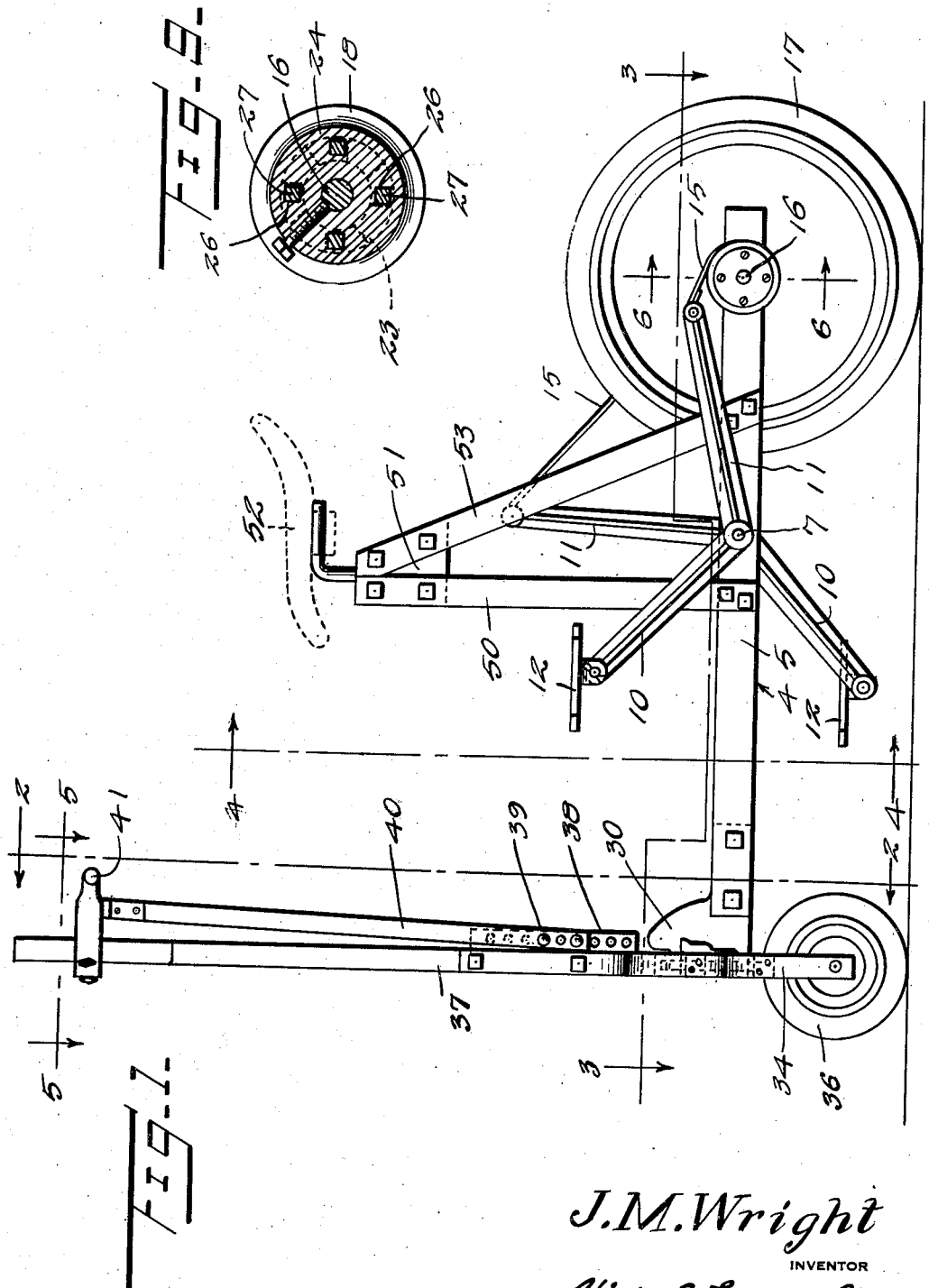
J.M.Wright
INVENTOR
BY Victor J.Evans&Co.
ATTORNEYS Jan. 2, 1940.  J. M. WRIGHT  2,185,698
BICYCLE
Filed Oct. 27, 1938   3 Sheets-Sheet 2
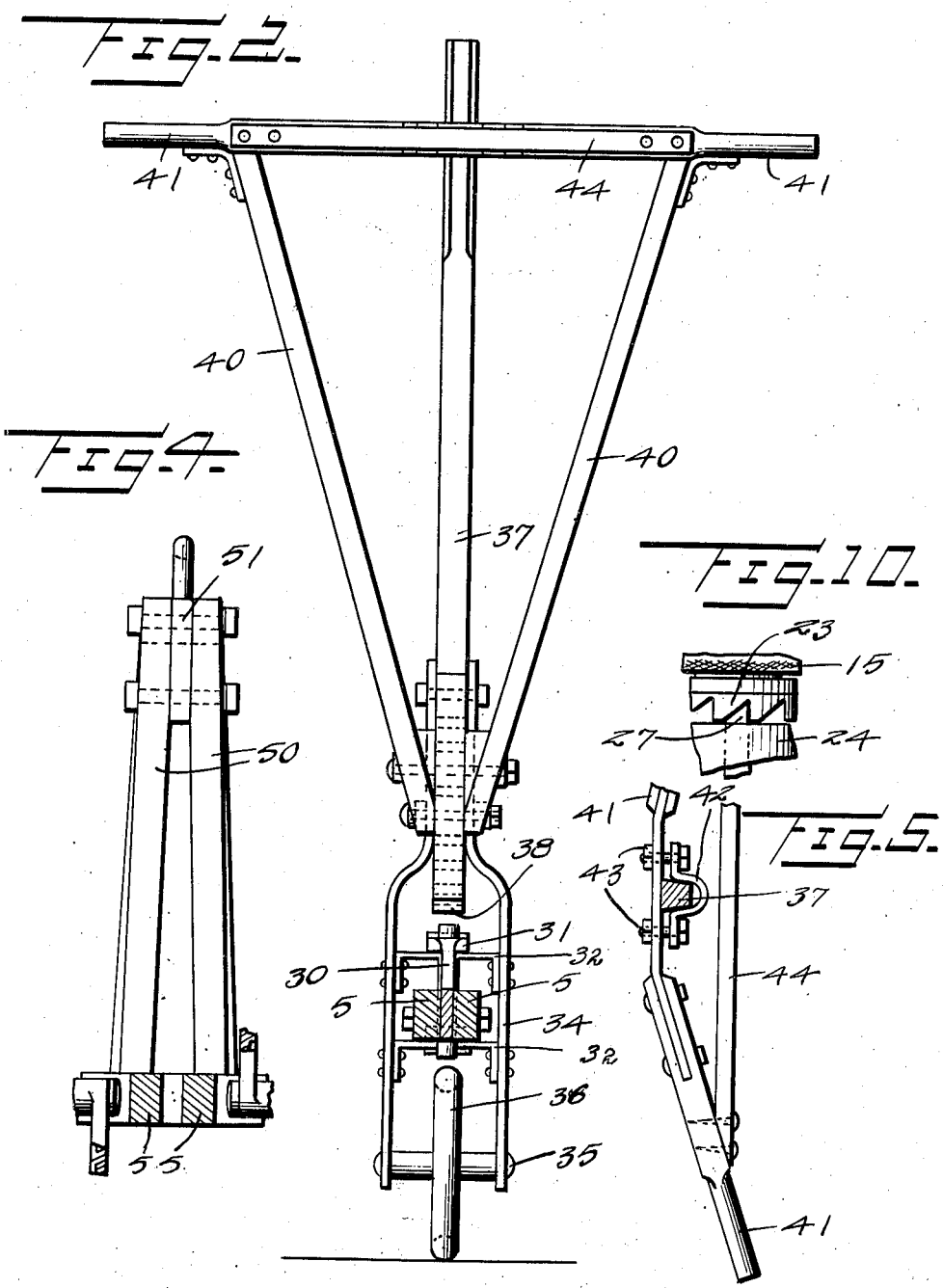
J. M. Wright
INVENTOR
BY Victor J. Evans & Co.
ATTORNEYS Jan. 2, 1940.  J. M. WRIGHT  2,185,698
BICYCLE
Filed Oct. 27, 1938   3 Sheets-Sheet 3
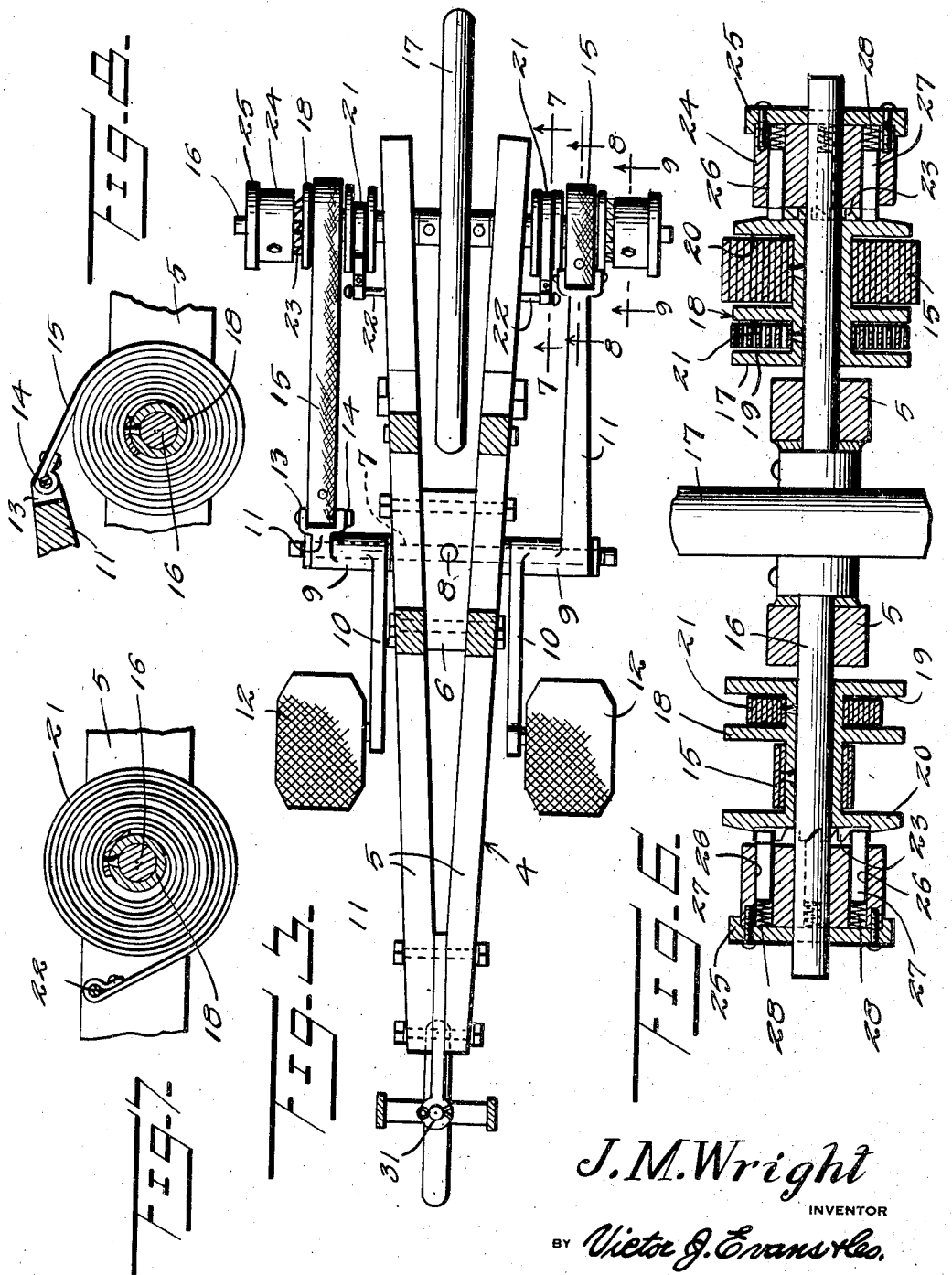
J.M.Wright
INVENTOR
BY *Victor J. Evans & Co.*
ATTORNEYS Patented Jan. 2, 1940

2,185,698

UNITED STATES PATENT OFFICE 2,185,698

BICYCLE

James Monroe Wright, Quitman, Ga.

Application October 27, 1938, Serial No. 237,355

1 Claim. (Cl. 280—87.04)

My invention relates to improvements in bicycles and more particularly to that type designed for use by children and has as one of the principal objects thereof the provision of such a device that is so constructed and arranged as to be more readily propelled and steered than such bicycles as are ordinarily constructed.

Another object of my invention is to provide a bicycle of the above described character which is simple in construction, durable in use, efficient in operation and economical in manufacture.

A further object of my invention is to provide a bicycle of the character described equipped with propelling means so constructed and arranged as to eliminate the so-called "dead center" usually present in devices of this character.

Other objects and advantages will be apparent from the following description, appended claim and annexed drawings.

Referring to the drawings wherein like reference characters designate like parts throughout the several views:

Figure 1 is a side elevation of my invention.

Figure 2 is a transverse sectional view taken on the line 2—2 of Figure 1.

Figure 3 is a horizontal sectional view taken on the line 3—3 of Figure 1.

Figure 4 is a detail sectional view taken on the line 4—4 of Figure 1.

Figure 5 is a detail sectional view taken on the line 5—5 of Figure 1 and illustrating the handle bar construction.

Figure 6 is an enlarged detail sectional view taken on the line 6—6 of Figure 1.

Figure 7 is a detail sectional view taken on the line 7—7 of Figure 3.

Figure 8 is a similar sectional view taken on the line 8—8 of Figure 3.

Figure 9 is another detail sectional view taken on the line 9—9 of Figure 3.

Figure 10 is a fragmentary top plan view of one of the clutch mechanisms.

In practicing my invention I provide a frame 4 comprising a pair of horizontal forwardly converging bars 5 connected together intermediate of their ends by a block 6 bolted thereto. Extending through said block and bars is a transversely extending shaft 7, the latter being fixed to said block by means of a set screw 8. The ends of the shaft 7 extend laterally of the bars 5 and have pivotally mounted thereon the hubs of bell cranks 9, the latter being provided with forwardly and rearwardly disposed rocker arms 10 and 11 respectively.

The forward ends of the arms 10 have pivoted thereon foot pedals 12. The rearwardly extending arms 11 are fashioned with bifurcated rear ends 13 through which extend bolts 14 about which are secured the front ends of flexible elements or straps 15.

Extending transversely through the rear ends of the bars 5 is a drive shaft 16 and fixed on said drive shaft, between said bars 5, is a propelling wheel 17 whereby my device is propelled as hereinafter more fully set forth. The ends of the drive shaft extend laterally of the bars 5 and loosely mounted on said ends adjacent the outer faces of the respective bars are drums 18 fashioned with inner and outer channels 19 and 20 respectively. The outer channels 20 receive therein the rear ends of the straps 15 and which are connected to the hub of the drums by rivets as clearly illustrated in Figure 6. The inner channels 19 have secured therein spiral springs 21, the inner ends of which are secured to the hubs of the drums by rivets. The outer ends of said springs are connected to pins 22 extending laterally from the respective bars 5.

The outer sides of the drums 18 are fashioned with clutch faces provided with ratchet teeth 23. The outer ends of the shaft 16 have fixed thereon housings 24 formed with square shaped sockets 26 opening outwardly towards said teeth 23 and the outer ends of the housings have bolted thereto plates 25 thereby closing the outer ends of the sockets 26.

Positioned in said sockets are pawls 27 for engagement with the teeth and located within the sockets 26 are springs 28 engaging the inner ends of the pawls 27 and the plates whereby to urge the pawls into engagement with the teeth 23 of the clutch faces.

From the foregoing it will be apparent that when the rocker arms are alternately rocked through the medium of the operator's feet, the drums 18 will be rotated in a direction to cause alternate tensioning of the springs 21 and at the same time effect alternate rotation of the shaft 16 through the medium of the pawls 27 engaging the respective clutch faces. When pressure is released on the respective pedals, the springs 21 serve to rotate the drums in an opposite direction and at the same time cause the pawls 27 to ratchet over the teeth 23. Continued alternate operation of the pedals will effect constant rotation of the wheel 17 in a forward direction.

The front ends of the bars 5 have bolted therebetween a vertically and forwardly disposed bearing plate 30, the front end of which is fashioned with a bifurcated bearing 31 having upper and lower sections embracing a pair of transverse arms 32 having right angularly disposed ends fixed to a pair of bracket arms or forks 34, the lower ends of which have extending therethrough a shaft 35 on which is mounted a guide or steering wheel 36. The upper ends of said arms embrace and are bolted to the lower end of a vertically disposed bar 37. A pin extends through the bearing and the arms 32 whereby to pivot the forks 34 to the plate 30 as clearly illustrated in the drawings.

The lower end of the bar 37 has secured thereto and extending rearwardly therefrom a plate 38 to which is adjustably attached, by means of bolts 39, the lower ends of a pair of braces 40. The upper end of the bar 37 has adjustably secured thereto a handle bar 41 by means of a U-shaped clamp 42 secured to the handle bar by bolts 43 as clearly illustrated in Figure 5 of the drawings. The upper ends of the braces 40 are secured to the handle bar. A cross brace 44 extends between and is connected to the outer ends of the handle bar. By loosening the bolts 43 and adjusting the bolts 39 into desired openings in the plate 38, the handle bar may be raised or lowered as desired.

Rearwardly and adjacent the block 6, the bars 5 have secured thereto upwardly extending members 50, the upper ends of which have bolted therebetween a seat bracket 51 provided with the usual seat or saddle 52. The seat bracket 51 extends rearwardly of the members 50 and has bolted thereto the upper ends of downwardly and rearwardly extending braces 53, the lower ends of the braces 53 being bolted to the outer sides of the bars 5 as clearly illustrated in Figure 1 of the drawings. Obviously, an operator seated on the saddle and grasping the handle bar is enabled to readily propel the bicycle as well as to steer the same.

From the foregoing it will be apparent that I have provided a simple and efficient device which may be more easily propelled and steered than bicycles of the ordinary character and which is especially adaptable for the use of children.

It is to be distinctly understood that various changes and modifications may be resorted to in the construction of my invention without departing from the spirit thereof or the scope of the appended claim.

What I claim is:

In a vehicle frame construction, a pair of frame members, a plate attached between said members at one end thereof and formed with a bearing, a pair of upwardly extending arms pivotally connected to said bearing, an upwardly extending bar connected between said arms above said bearing, a handle bar adjustably connected to said first mentioned bar, and braces carried by said handle bar and adjustably connected to said first mentioned bar for maintaining said bars in braced condition with respect to each other.

JAMES MONROE WRIGHT.